(12) United States Patent
Higurashi

(10) Patent No.: US 6,381,281 B1
(45) Date of Patent: Apr. 30, 2002

(54) INFORMATION COMPRESSING APPARATUS

(75) Inventor: Seiji Higurashi, Tokyo (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/457,365

(22) Filed: Dec. 9, 1999

(30) Foreign Application Priority Data

Dec. 24, 1998 (JP) .......................................... 10-366744

(51) Int. Cl.[7] ................................................ H04N 7/12
(52) U.S. Cl. ............................................... 375/240.26
(58) Field of Search ....................... 375/240.26, 240.27, 375/240.28, 240.29; 348/423.1, 425.1, 425.2, 425.3, 425.4, 512, 515, 533; 386/39, 52–54, 51, 96, 104

(56) References Cited

U.S. PATENT DOCUMENTS 5,717,815 A * 2/1998 Nakano et al. ................ 385/53
6,018,376 A * 1/2000 Nakatani ..................... 348/845.2
6,181,383 B1 * 1/2001 Fox et al. ....................... 348/515
6,195,387 B1 * 2/2001 Moeller et al. ................ 375/240

* cited by examiner

Primary Examiner—Vu Le
(74) Attorney, Agent, or Firm—Louis Woo

(57) ABSTRACT

Detection is made as to whether or not a first video signal becomes discontinuous and hence a defective frame picture occurs in a stream of frame pictures represented by the first video signal. The defective frame picture is removed from the stream of frame pictures to change the first video signal into a second video signal representing the stream of frame pictures except the defective frame picture. A first audio signal is divided into a second audio signal and a third audio signal. The second audio signal occurs until the first video signal becomes discontinuous. The third audio signal occurs after the first video signal becomes discontinuous. A memory stores the second audio signal. The second audio signal stored by the memory and the third audio signal are mixed into a fourth audio signal to fade in the third audio signal and to fade out the second audio signal in the fourth audio signal.

6 Claims, 4 Drawing Sheets

INFORMATION COMPRESSING APPARATUS

BACKGROUND OF THE INVENTION

1. Field of the Invention

This invention relates to an apparatus for compressively encoding an information signal including both a video signal and an audio signal.

2. Description of the Related Art

A prior-art information compressing apparatus in an MPEG (Moving Picture Experts Group) system compressively encodes a stream of original pictures each assigned to one of first, second, and third types. The first type corresponds to I-pictures (intra-coded pictures). The second type corresponds to P-pictures (predictive-coded pictures). The third type corresponds to B-pictures (bidirectionally predictive-coded pictures). The prior-art information compressing apparatus implements a compressing process GOP by GOP, where GOP means a group of pictures. Every GOP is composed of one I-picture and at least one P-picture or one B-picture. For every GOP, an I-picture is encoded first even in the case where the I-picture occupies a second or later picture place within the GOP.

As the numbers of original pictures in GOP's increase, the qualities of encoding-resultant pictures rise. As the numbers of original pictures in GOP's increase, units of the compressing process increase so that units of editing picture information also increase. The increased units make fine editing difficult. On the other hand, as the numbers of original pictures in GOP's decrease, the qualities of encoding-resultant pictures drop.

It is assumed that editing causes encoding to pause at a P-picture in a GOP which follows an I-picture therein in the order of encoding. When encoding is restarted, it is necessary to commence encoding from the I-picture in that GOP again. Accordingly, in this case, the encoding of the I-picture is executed twice, and hence the efficiency of editing-related encoding work tends to be low.

In general, an original audio signal is also compressively encoded while the synchronization between audio information and video information is maintained. Audio information which results from editing tends to have a great stepwise level change at the editing point. Such a level change causes a click during the playback of the audio information.

SUMMARY OF THE INVENTION

It is an object of this invention to provide an information compressing apparatus capable of suppressing a click represented by a compression-resultant audio signal which might be caused by editing.

A first aspect of this invention provides an information compressing apparatus comprising a first address generation circuit for generating a first address signal; a second address generation circuit for generating a second address signal; a first memory for storing a video signal in response to the first address signal generated by the first address generation circuit; a second memory for storing an audio signal in response to the second address signal generated by the second address generation circuit; first means for periodically updating the first address signal generated by the first address generation circuit; second means for periodically updating the second address signal generated by the second address generation circuit; a first compression processing circuit for reading out the video signal from the first memory, and subjecting the read-out video signal to a first compressively encoding process; a second compression processing circuit for reading out the audio signal from the second memory, and subjecting the read-out audio signal to a second compressively encoding process; third means for detecting a head of every frame represented by the video signal; fourth means for storing a first state of the first address signal generated by the first address generation circuit which corresponds to a latest frame head detected by the third means; fifth means for storing a second state of the first address signal generated by the first address generation circuit which corresponds to a second frame head detected by the third means, the second frame head immediately preceding the latest frame head; sixth means for storing a first state of the second address signal generated by the second address generation circuit which corresponds to the latest frame head detected by the third means; seventh means for storing a second state of the second address signal generated by the second address generation circuit which corresponds to the second frame head detected by the third means; eighth means for detecting whether or not the video signal becomes discontinuous; ninth means for suspending operation of the first means and also operation of the first compression processing circuit when the eighth means detects that the video signal becomes discontinuous; tenth means for suspending operation of the second means and also operation of the second compression processing circuit when the eighth means detects that the video signal becomes discontinuous; eleventh means for detecting whether or not the video signal returns to a normally continuous state after the video signal becomes discontinuous; twelfth means for starting the updating of the first address signal by the first means from one of the first state stored by the fourth means and the second state stored by the fifth means when the eleventh means detects that the video signal returns to its normally continuous state after the video signal becomes discontinuous; thirteenth means for starting the updating of the second address signal by the second means from one of the first state stored by the sixth means and the second state stored by the seventh means when the eleventh means detects that the video signal returns to its normally continuous state after the video signal becomes discontinuous; and fourteenth means for, in cases where the eleventh means detects that the video signal returns to its normally continuous state after the video signal becomes discontinuous, reading out the audio signal from the second memory and mixing the read-out audio signal and a new audio signal into a mixing-resultant audio signal, and writing the mixing-resultant audio signal into the second memory until the second address signal reaches a prescribed address value.

A second aspect of this invention is based on the first aspect thereof, and provides an information compressing apparatus further comprising fifteenth means for deciding whether or not an address value represented by the second address signal, which occurs when the eighth means detects that the video signal becomes discontinuous, is smaller than the prescribed address value; sixteenth means for, in cases where the fifteenth means decides that the address value represented by the second address signal is smaller than the prescribed address value, to cause the twelfth means to start the updating of the first address signal from the second state stored by the fifth means; seventeenth means for, in cases where the fifteenth means decides that the address value represented by the second address signal is smaller than the prescribed address value, to cause the thirteenth means to start the updating of the second address signal from the second state stored by the seventh means; eighteenth means for, in cases where the fifteenth means decides that the address value represented by the second address signal is not smaller than the prescribed address value, to cause the twelfth means to start the updating of the first address signal from the first state stored by the fourth means; and nineteenth means for, in cases where the fifteenth means decides that the address value represented by the second address signal is not smaller than the prescribed address value, to cause the thirteenth means to start the updating of the second address signal from the first state stored by the sixth means.

A third aspect of this invention is based on the first aspect thereof, and provides an information compressing apparatus wherein the fourteenth means comprises means for fading in the new audio signal and fading out the read-out audio signal while mixing the read-out audio signal and the new audio signal.

A fourth aspect of this invention is based on the first aspect thereof, and provides an information compressing apparatus wherein the eighth means comprises an encoding pause button; and means for detecting whether or not the video signal becomes discontinuous in response to a position of the encoding pause button.

A fifth aspect of this invention is based on the first aspect thereof, and provides an information compressing apparatus wherein the eleventh means comprises an encoding pause button; and means for detecting whether or not the video signal returns to a normally continuous state after the video signal becomes discontinuous in response to a position of the encoding pause button.

A sixth aspect of this invention provides an apparatus comprising first means for detecting whether or not a first video signal becomes discontinuous and hence a defective frame picture occurs in a stream of frame pictures represented by the first video signal; second means for removing the defective frame picture from the stream of frame pictures to change the first video signal into a second video signal representing the stream of frame pictures except the defective frame picture; third means for dividing a first audio signal into a second audio signal and a third audio signal, the second audio signal occurring until the first video signal becomes discontinuous, the third audio signal occurring after the first video signal becomes discontinuous; fourth means for storing the second audio signal; and fifth means for mixing the second audio signal stored by the fourth means and the third audio signal into a fourth audio signal to fade in the third audio signal and to fade out the second audio signal in the fourth audio signal.

DESCRIPTION OF THE PREFERRED EMBODIMENT

First Embodiment

Figure 1:
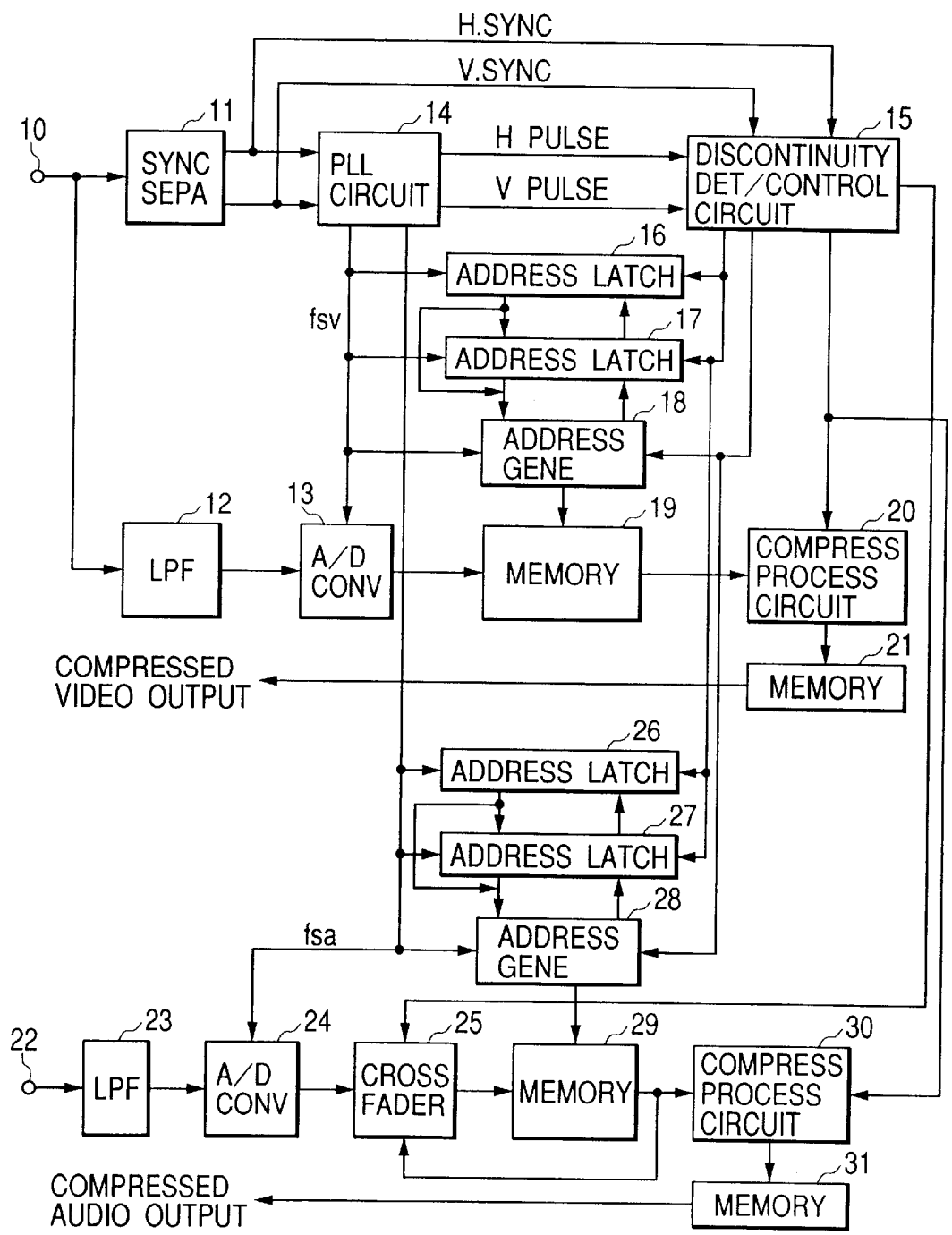
FIG. 1 is a block diagram of an information compressing apparatus according to a first embodiment of this invention.

FIG. 1 shows an information compressing apparatus according to a first embodiment of this invention. With reference to FIG. 1, an analog input video signal is fed via an input terminal 10 to a sync separation circuit 11 and a low pass filter (LPF) 12.

The sync separation circuit II separates a horizontal sync signal (H. SYNC) from the input video signal. In addition, the sync separation circuit 11 separates a vertical sync signal (V. SYNC) from the input video signal.

The low pass filter 12 removes high-frequency components from the input video signal. The low pass filter 12 outputs a resultant signal to an analog-to-digital (A/D) converter 13. The A/D converter 13 changes the output signal of the low pass filter 12 into a corresponding digital video signal in response to a video clock signal (a video sampling clock signal) "fsv".

An analog input audio signal is fed via an input terminal 22 to a low pass filter (LPF) 23. The analog input audio signal is in a frame-by-frame synchronized relation with the analog input video signal. The low pass filter 23 removes high-frequency components from the input audio signal. The low pass filter 23 outputs a resultant signal to an analog-to-digital (A/D) converter 24. The A/D converter 24 changes the output signal of the low pass filter 23 into a corresponding digital audio signal in response to an audio clock signal (an audio sampling clock signal) "fsa".

The sync separation circuit 11 outputs the horizontal sync signal and the vertical sync signal to a PLL (phase locked loop) circuit 14. A first section of the PLL circuit 14 generates a video sampling clock signal "fsv" in response to the horizontal sync signal and the vertical sync signal. The video sampling clock signal "fsv" has a given frequency equal to or higher than twice the maximum frequency of the input video signal. The video sampling clock signal "fsv" is phase-locked with respect to the horizontal sync signal and the vertical sync signal. A second section of the PLL circuit 14 generates an H pulse signal in response to the horizontal sync signal. The H pulse signal is phase-locked with respect to the horizontal sync signal. The H pulse signal has a given frequency equal to a horizontal scanning frequency related to the input video signal. A third section of the PLL circuit 14 generates a V pulse signal in response to the vertical sync signal. The V pulse signal is phase-locked with respect to the vertical sync signal. The V pulse signal has a given frequency equal to a vertical scanning frequency related to the input video signal. A fourth section of the PLL circuit 14 generates an audio sampling clock signal "fsa" in response to the horizontal sync signal and the vertical sync signal. The audio sampling clock signal "fsa" has a given frequency equal to or higher than twice the maximum frequency of the input audio signal. The audio sampling clock signal "fsa" is phase-locked with respect to the horizontal sync signal and the vertical sync signal.

When a discontinuity occurs in the input video signal, at least one of the horizontal sync signal and the vertical sync signal outputted from the sync separation circuit 11 becomes also discontinuous. On the other hand, during a short time interval following the moment of the occurrence of the discontinuity, the H pulse signal and the V pulse signal generated by the PLL circuit 14 continue to be in conditions phase-locked with respect to the horizontal sync signal and the vertical sync signal which are present before the occurrence of the discontinuity.

The sync separation circuit 11 outputs the horizontal sync signal and the vertical sync signal to a discontinuity detection/control circuit 15. The PLL circuit 14 outputs the H pulse signal and the V pulse signal to the discontinuity detection/control circuit 15.

The discontinuity detection/control circuit 15 compares the phases of the horizontal sync signal and the H pulse signal with each other. Also, the discontinuity detection/ control circuit 15 compares the phases of the vertical sync signal and the V pulse signal with each other. These phase comparisons are to determine whether or not the input video signal becomes discontinuous (determine whether or not at least one of the phase lock between the horizontal sync signal and the H pulse signal and the phase lock between the vertical sync signal and the V pulse signal is lost). When it is determined that the input video signal becomes discontinuous, the discontinuity detection/control circuit 15 generates a disabling signal and a halt signal. The discontinuity detection/control circuit 15 outputs the disabling signal to address generation circuits 18 and 28. The discontinuity detection/control circuit 15 outputs the halt signal to compression processing circuits 20 and 30.

The discontinuity detection/control circuit 15 generates a signal of an effective area of pictures (frames or fields) represented by the input video signal in response to the H pulse signal and the V pulse signal. As long as it is determined that the input video signal does not become discontinuous, the discontinuity detection/control circuit 15 generates either an enabling signal or a disabling signal in response to the effective-area signal. The discontinuity detection/control circuit 15 outputs either the enabling signal or the disabling signal to the address generation circuits 18 and 28. When the present moment (or the currently-processed time segment of the input video signal) corresponds to a position within the effective area of the current frame, the discontinuity detection/control circuit 15 outputs the enabling signal to the address generation circuits 18 and 28. When the present moment (or the currently-processed time segment of the input video signal) corresponds to a position outside the effective area of the current frame, the discontinuity detection/control circuit 15 outputs the disabling signal to the address generation circuits 18 and 28.

The discontinuity detection/control circuit 15 detects a timing, which corresponds to the position of a head of every frame (a head of the effective area in every frame) represented by the input video signal, in response to the H pulse signal and the V pulse signal. As long as it is determined that the input video signal does not become discontinuous, the discontinuity detection/control circuit 15 generates a first load signal (a first load pulse) in response to the detected timing. Preferably, the duration of the first load signal is set to a given short time interval. The discontinuity detection/control circuit 15 outputs the first load signal to address latches 16, 17, 26, and 27.

The discontinuity detection/control circuit 15 has the function to determine whether or not a discontinuity disappears from the input video signal and hence the input video signal returns to its normal state. This determination is implemented by comparing the phases of the horizontal sync signal and the H pulse signal with each other, and also comparing the phases of the vertical sync signal and the V pulse signal with each other. Upon detection of a timing corresponding to the position of a head of a first frame (a head of the effective area in a first frame) after it is determined that a discontinuity disappears from the input video signal, the discontinuity detection/control circuit 15 generates a second load signal and outputs the second load signal to the address generation circuits 18 and 28. At the same time, the discontinuity detection/control circuit 15 replaces the disabling signal with the enabling signal. In addition, the discontinuity detection/control circuit 15 suspends the generation of the halt signal.

The PLL circuit 14 feeds the video sampling clock signal "fsv" to the address generation circuit 18 as a video address updating clock signal. The address generation circuit 18 produces a signal of a memory address (a memory address signal) in response to the video address updating clock signal, that is, the video sampling clock signal "fsv". The memory address represented by the memory address signal can be periodically updated or incremented in response to the video address updating clock signal (the video sampling clock signal "fsv"). The enabling signal fed to the address generation circuit 18 from the discontinuity detection/control circuit 15 permits the memory address signal to be periodically updated or incremented in response to the video address updating clock signal (the video sampling clock signal "fsv"). The disabling signal fed to the address generation circuit 18 from the discontinuity detection/control circuit 15 inhibits the memory address signal from being periodically updated or incremented in response to the video address updating clock signal (the video sampling clock signal "fsv"). The address generation circuit 18 outputs the memory address signal to the address latch 17 and a memory 19.

The PLL circuit 14 feeds the video sampling clock signal "fsv" to the address latch 17. As previously indicated, the address latch 17 receives the first load signal (the first load pulse) from the discontinuity detection/control circuit 15. The device 17 latches the memory address signal, which corresponds to the position of a head in every frame (a head of the effective area in every frame) represented by the input video signal, in response to the first load signal and the video sampling clock signal "fsv". The memory address signal latched by the device 17 is updated for every frame. The memory address signal latched by the device 17 is applied to the address latch 16 and the address generation circuit 18.

The PLL circuit 14 feeds the video sampling clock signal "fsv" to the address latch 16. As previously indicated, the address latch 16 receives the first load signal (the first load pulse) from the discontinuity detection/control circuit 15. The device 16 latches the memory address signal, which is outputted from the address latch 17, in response to the first load signal and the video sampling clock signal "fsv". The memory address signal latched by the device 16 is updated for every frame. The memory address signal latched by the device 16 is applied to the address latch 17 and the address generation circuit 18. The address latch 16 is connected to the address latch 17 to form a shift register in conjunction therewith. The memory address signal is shifted from the address latch 17 to the address latch 16 in response to the first load signal (the first load pulse).

The PLL circuit 14 feeds the audio sampling clock signal "fsa" to the address generation circuit 28 as an audio address updating clock signal. The address generation circuit 28 produces a signal of a memory address (a memory address signal) in response to the audio address updating clock signal, that is, the audio sampling clock signal "fsa". The memory address represented by the memory address signal can be periodically updated or incremented in response to the audio address updating clock signal (the audio sampling clock signal "fsa"). The enabling signal fed to the address generation circuit 28 from the discontinuity detection/control circuit 15 permits the memory address signal to be periodically updated or incremented in response to the audio address updating clock signal (the audio sampling clock signal "fsa"). The disabling signal fed to the address generation circuit 28 from the discontinuity detection/control circuit 15 inhibits the memory address signal from being periodically updated or incremented in response to the audio address updating clock signal (the audio sampling clock signal "fsa"). The address generation circuit 28 outputs the memory address signal to the address latch 27 and a memory 29.

The PLL circuit 14 feeds the audio sampling clock signal "fsa" to the address latch 27. As previously indicated, the address latch 27 receives the first load signal (the first load pulse) from the discontinuity detection/control circuit 15. The device 27 latches the memory address signal, which corresponds to the position of a head in every frame (a head of the effective area in every frame) represented by the input video signal, in response to the first load signal and the audio sampling clock signal "fsa". The memory address signal latched by the device 27 is updated for every frame. The memory address signal latched by the device 27 is applied to the address latch 26 and the address generation circuit 28.

The PLL circuit 14 feeds the audio sampling clock signal "fsa" to the address latch 26. As previously indicated, the address latch 26 receives the first load signal (the first load pulse) from the discontinuity detection/control circuit 15. The device 26 latches the memory address signal, which is outputted from the address latch 27, in response to the first load signal and the audio sampling clock signal "fsa". The memory address signal latched by the device 26 is updated for every frame. The memory address signal latched by the device 26 is applied to the address latch 27 and the address generation circuit 28. The address latch 26 is connected to the address latch 27 to form a shift register in conjunction therewith. The memory address signal is shifted from the address latch 27 to the address latch 26 in response to the first load signal (the first load pulse).

The PLL circuit 14 outputs the video sampling clock signal "fsv" to the A/D converter 13. The A/D converter 13 periodically samples the output signal of the low pass filter 12 in response to the video sampling clock signal "fsv", and converts every sample of the output signal of the low pass filter 12 into a digital video signal sample (a video data piece). The A/D converter 13 sequentially outputs digital video signal samples (video data pieces) to the memory 19.

The memory 19 stores every video data piece (every digital video signal sample) into its storage segment, the address of which is equal to the address represented by the memory address signal fed from the address generation circuit 18. In the case where the address is periodically updated, video data pieces generated by the A/D converter 13 are sequentially and cyclically stored into storage segments of the memory 19. Video data pieces in the memory 19 correspond to a given number of frames. The compression processing circuit 20 reads out video data pieces from the memory 19. The video data pieces read out from the memory 19 compose output video data from the memory 19.

The compression processing circuit 20 compressively encodes the output video data from the memory 19 into encoding-resultant video data according to a known MPEG encoding algorithm. The compression processing circuit 20 feeds the encoding-resultant video data to a memory 21.

The memory 21 accumulates the encoding-resultant video data. After the memory 21 accumulates a 1-program-corresponding amount of the encoding-resultant video data, the encoding-resultant video data is read out from the memory 21 at a constant rate. The memory 21 includes a recording medium such as a hard disc or an optical disc.

The PLL circuit 14 outputs the audio sampling clock signal "fsa" to the A/D converter 24. The A/D converter 24 periodically samples the output signal of the low pass filter 23 in response to the audio sampling clock signal "fsa", and converts every sample of the output signal of the low pass filter 23 into a digital audio signal sample (an audio data piece). The A/D converter 24 sequentially outputs digital audio signal samples (audio data pieces) to a cross-fader 25.

The discontinuity detection/control circuit 15 generates a control signal for the cross-fader 25 in response to the result of the determination as to whether or not the input video signal becomes discontinuous. The discontinuity detection/control circuit 15 feeds the control signal to the cross-fader 25. The cross-fader 25 is either enabled or disabled in response to the control signal. While the cross-fader 25 remains disabled, the device 25 passes the audio data from the A/D converter 24 to the memory 29 as they are. In the case where the cross-fader 25 is enabled, the device 25 reads out audio data from the memory 29. Then, the cross-fader 25 multiplies the audio data from the A/D converter 24 by a weighting coefficient "α" and multiplies the audio data from the memory 29 by a weighting coefficient "1−α", and adds the multiplication results into addition-result audio data. The weighting coefficient "α" gradually increases from "0" to "1" while the weighting coefficient "1−α" gradually decreases from "1" to "0". The cross-fader 25 outputs the addition-result audio data to the memory 29.

The memory 29 stores every audio data piece (every digital audio signal sample) into its storage segment, the address of which is equal to the address represented by the memory address signal fed from the address generation circuit 28. In the case where the address is periodically updated, audio data pieces outputted from the cross-fader 25 are sequentially and cyclically stored into storage segments of the memory 29. Audio data pieces in the memory 29 correspond to a given number of video frames. The compression processing circuit 30 reads out audio data pieces from the memory 29. The audio data pieces read out from the memory 29 compose output audio data from the memory 29.

The compression processing circuit 30 compressively encodes the output audio data from the memory 29 into encoding-resultant audio data according to the known MPEG encoding algorithm. The compression processing circuit 30 feeds the encoding-resultant audio data to a memory 31.

The memory 31 accumulates the encoding-resultant audio data. After the memory 31 accumulates a 1-program-corresponding amount of the encoding-resultant audio data, the encoding-resultant audio data is read out from the memory 31 at a constant rate. The memory 31 includes a recording medium such as a hard disc or an optical disc. It should be noted that the memories 21 and 31 may use a common memory.

In the case where a discontinuity occurs in the input video signal as a result of, for example, a change of an input channel, at least one of the horizontal sync signal and the vertical sync signal outputted from the sync separation circuit 11 becomes also discontinuous. On the other hand, during at least an initial stage following the discontinuity in the input video signal, the H pulse signal and the V pulse signal generated by the PLL circuit 14 remain in conditions phase-locked with respect to the horizontal sync signal and the vertical sync signal which are present before the occurrence of the discontinuity. Thus, the discontinuity detection/control circuit 15 detects the occurrence of the discontinuity in the input video signal by comparing the phases of the horizontal sync signal and the H pulse signal with each other, and also comparing the phases of the vertical sync signal and the V pulse signal with each other.

Figure 2:
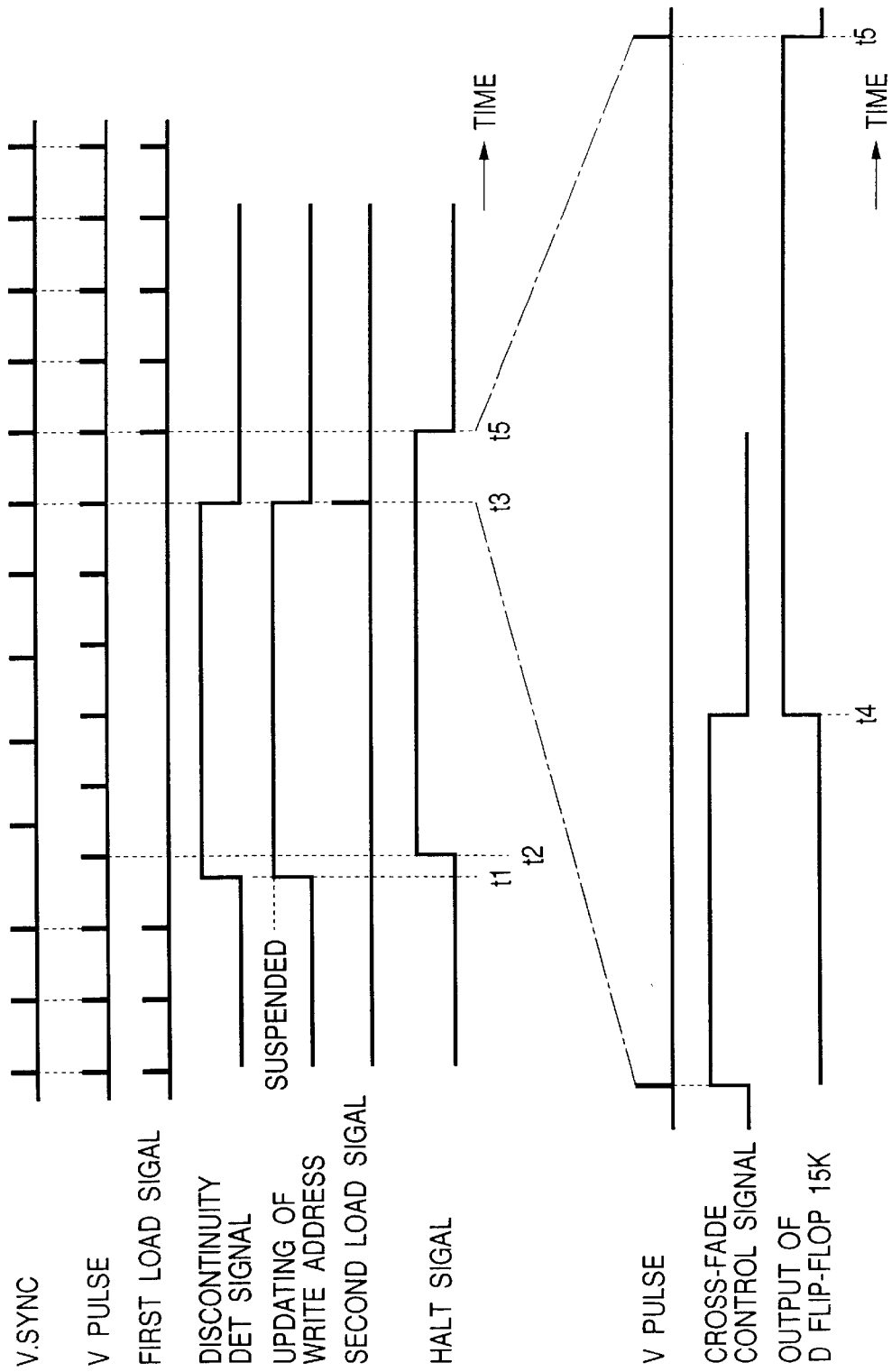
FIG. 2 is a time-domain diagram of various signals in the apparatus of FIG. 1.

It is assumed that as shown in FIG. 2, at a moment t1, the input video signal becomes discontinuous, and hence the phase lock between the vertical sync signal and the V pulse signal is lost. In this case, the discontinuity detection/control circuit 15 senses the loss of the phase lock between the vertical sync signal and the V pulse signal, and thereby detects the occurrence of a discontinuity in the input video signal. As shown in FIG. 2, at the moment t2, the discontinuity detection/control circuit 15 starts to generate a high-level discontinuity detection signal in response to the detection of the occurrence of the discontinuity in the input video signal. The discontinuity detection/control circuit 15 outputs the high-level discontinuity detection signal to the address generation circuits 18 and 28 as the disabling signal. The disabling signal outputted to the address generation circuit 18 inhibits the memory address signal from being periodically updated or incremented in response to the video address updating clock signal (the video sampling clock signal "fsv"). The disabling signal outputted to the address generation circuit 28 inhibits the memory address signal from being periodically updated or incremented in response to the audio address updating clock signal (the audio sampling clock signal "fsa"). Thus, as shown in FIG. 2, the updating of the write addresses of the memories 19 and 29 is suspended. In addition, the discontinuity detection/control circuit 15 generates a high-level halt signal in response to the detection of the occurrence of the discontinuity in the input video signal. Specifically, as shown in FIG. 2, at a moment t2 when a first pulse in the V pulse signal occurs after the moment t1, the discontinuity detection/control circuit 15 starts to generate the high-level halt signal. The discontinuity detection/control circuit 15 outputs the halt signal to the compression processing circuits 20 and 30. The compression processing circuit 20 suspends the compressively encoding of the video data in response to the halt signal. The compression processing circuit 30 suspends the compressively encoding of the audio data in response to the halt signal.

As shown in FIG. 2, when it is determined that the input video signal becomes discontinuous, the discontinuity detection/control circuit 15 suspends outputting the first load signal (the first load pulse) to the address latches 16, 17, 26, and 27. In general, a discontinuity occurs in the input video signal at a mid point in a frame and this frame becomes a defective frame. While the discontinuity detection/control circuit 15 continues to suspend outputting the first load signal, the address latches 17 and 27 hold the memory address signals corresponding to the position of the head in the defective frame. On the other hand, the address latches 16 and 26 hold the memory address signals corresponding to the position of the head in a frame immediately preceding the defective frame.

During the suspension of the compressively encoding by the compression processing circuits 20 and 30, the discontinuity detection/control circuit 15 remains comparing the phases of the horizontal sync signal and the H pulse signal with each other, and also comparing the phases of the vertical sync signal and the V pulse signal with each other to determine whether or not the discontinuity disappears from the input video signal and hence the input video signal returns to its normal state (determine whether or not the phase lock between the horizontal sync signal and the H pulse signal and also the phase lock between the vertical sync signal and the V pulse signal are restored).

After it is determined that the discontinuity disappears from the input video signal and hence the input video signal returns to its normal state, the discontinuity detection/control circuit 15 detects a timing t3 which corresponds to the position of a head of a first frame (a head of the effective area in a first frame) represented by the input video signal. As shown in FIG. 2, upon the detection of the timing t3, the discontinuity detection/control circuit 15 stops outputting the high-level discontinuity detection signal, and thereby replaces the disabling signal with the enabling signal and outputs the enabling signal to the address generation circuits 18 and 28. At the same time, the discontinuity detection/control circuit 15 generates a second load signal and outputs the second load signal to the address generation circuits 18 and 28.

The address generation circuit 18 is loaded with the memory address signal from the address latch 16 or 17 in response to the second load signal. Thus, the memory address signal fed to the memory 19 from the address generation circuit 18 is equalized to the memory address signal latched by the address latch 16 or 17 which represents an address corresponding to the head of the defective frame (the frame subjected to the discontinuity in the input video signal) or the frame immediately preceding the defective frame. At the same time, the address generation circuit 28 is loaded with the memory address signal from the address latch 26 or 27 in response to the second load signal. Thus, the memory address signal fed to the memory 29 from the address generation circuit 28 is equalized to the memory address signal latched by the address latch 26 or 27 which represents an address corresponding to the head of the defective frame (the frame subjected to the discontinuity in the input video signal) or the frame immediately preceding the defective frame.

In this case, the decision regarding which of the memory address signal from the address latch 16 and the memory address signal from the address latch 17 should be used by the address generation circuit 18, and the decision regarding which of the memory address signal from the address latch 26 and the memory address signal from the address latch 27 should be used by the address generation circuit 28 are responsive to a parameter corresponding to at least one of the memory address signals produced by the address generation circuits 18 and 28 at the moment (the moment t1 in FIG. 2) of the occurrence of the discontinuity in the input video signal. Specifically, the discontinuity detection/control circuit 15 receives the audio sampling clock signal "fsa" from the PLL circuit 14. The discontinuity detection/control circuit 15 counts pulses of the audio sampling clock signal "fsa" during every period which starts from the moment of the generation of the first load signal. At the moment (the moment t1 in FIG. 2) of the occurrence of the discontinuity in the input video signal, the discontinuity detection/control circuit 15 decides whether or not the counted pulse number is smaller than a predetermined number. The predetermined number corresponds to a predetermined amount of audio data stored in the memory 29 and related to the defective frame (the frame subjected to the discontinuity in the input video signal). The predetermined amount of audio data is the criterion of a judgment regarding whether cross-fade between audio data from the memory 29 and audio data from the A/D converter 24 is possible or impossible with respect to the defective frame. Thus, the discontinuity detection/control circuit 15 decides whether cross-fade is possible or impossible with respect to the defective frame. The discontinuity detection/control circuit 15 holds and stores information of the result of the decision regarding whether cross-fade is possible or impossible with respect to the defective frame. The discontinuity detection/control circuit 15 uses the information of the cross-fade-related decision result after the discontinuity disappears.

In the case it has been decided that cross-fade is possible with respect to the defective frame, the discontinuity detection/control circuit 15 outputs a first selection signal to the address generation circuits 18 and 28. The first selection signal causes the address generation circuit 18 to be loaded with the memory address signal from the address latch 17 in response to the second load signal. Thus, the memory address signal fed to the memory 19 from the address generation circuit 18 is equalized to the memory address signal latched by the address latch 17 which represents an address corresponding to the head of the defective frame (the frame subjected to the discontinuity in the input video signal). At the same time, the first selection signal causes the address generation circuit 28 to be loaded with the memory address signal from the address latch 27 in response to the second load signal. Thus, the memory address signal fed to the memory 29 from the address generation circuit 28 is equalized to the memory address signal latched by the address latch 27 which represents an address corresponding to the head of the defective frame (the frame subjected to the discontinuity in the input video signal).

On the other hand, in the case where it has been decided that cross-fade is impossible with respect to the defective frame, the discontinuity detection/control circuit 15 outputs a second selection signal to the address generation circuits 18 and 28. The second selection signal causes the address generation circuit 18 to be loaded with the memory address signal from the address latch 16 in response to the second load signal. Thus, the memory address signal fed to the memory 19 from the address generation circuit 18 is equalized to the memory address signal latched by the address latch 16 which represents an address corresponding to the head of the frame immediately preceding the defective frame (the frame subjected to the discontinuity in the input video signal). At the same time, the second selection signal causes the address generation circuit 28 to be loaded with the memory address signal from the address latch 26 in response to the second load signal. Thus, the memory address signal fed to the memory 29 from the address generation circuit 28 is equalized to the memory address signal latched by the address latch 26 which represents an address corresponding to the head of the frame immediately preceding the defective frame (the frame subjected to the discontinuity in the input video signal).

Then, the memory address signal fed to the memory 19 from the address generation circuit 18 is periodically updated or incremented from the frame-head-corresponding address in response to the video sampling clock signal "fsv" since the disabling signal fed to the address generation circuit 18 is replaced by the enabling signal. Digital video signal samples outputted from the A/D converter 13 are sequentially written into respective positionally-correct storage segments of the memory 19 while the memory address signal fed to the memory 19 is periodically updated or incremented. Accordingly, the normally writing of digital video signal samples into the memory 19 from the A/D converter 13 restarts. Regarding the restart, a first digital video signal sample written into the memory 19 corresponds to the head of the present frame (the head of the effective area in the present frame), and the storage segment into which the first digital video signal sample is written corresponds to the head of the previous frame (the head of the effective area in the previous frame) being the defective frame or the frame immediately preceding the defective frame. After the restart, the discontinuity detection/control circuit 15 detects a timing t5 which corresponds to the position of a head of a first frame (a head of the effective area in a first frame) represented by the input video signal. As shown in FIG. 2, upon the detection of the timing t5, the discontinuity detection/control circuit 15 stops outputting the high-level halt signal to the compression processing circuits 20 and 30. When outputting the high-level halt signal is stopped, the compression processing circuit 20 restarts the readout of the video data from the memory 19 and the compressively encoding of the video data.

In the case where a discontinuity occurs in the input video signal at a mid point in a frame and this frame becomes a defective frame, a 1-frame-corresponding set of digital video signal samples corresponding to the defective frame and an associated old frame are left in the memory 19. Also, digital video signal samples corresponding to a given number of previous complete frames are left in the memory 19. After the discontinuity disappears and hence the input video signal returns to its normal state, the normally writing of digital video signal samples into the memory 19 from the A/D converter 13 is restarted at a moment corresponding to a head of a first new frame (a head of the effective area in a first new frame). Firstly, digital video signal samples composing a complete set for the first new frame are stored into positionally-correct storage segments of the memory 19 respectively. Subsequently, digital video signal samples composing a complete set for a second new frame are stored into positionally-correct storage segments of the memory 19 respectively. In the memory 19, the digital video signal samples corresponding to the first new frame or the second new frame are written over the digital video signal samples corresponding to the defective frame and the associated old frame. Accordingly, the digital video signal samples corresponding to the defective frame are prevented from being read out and processed by the compression processing circuit 20. After the discontinuity disappears and hence the input video signal returns to its normal state, a complete set of the digital video signal samples for each new frame is transmitted from the memory 19 to the compression processing circuit 20, and is processed by the compression processing circuit 20. Accordingly, even if a discontinuity causing a defective frame (a defective picture) occurs in the input video signal, the defective frame (the defective picture) is automatically removed from a stream of frames processed by the compression processing circuit 20. Thus, in the case where a discontinuity occurs in the input video signal and then the discontinuity disappears therefrom, the compression processing circuit 20 can implement the compressively encoding while maintaining a frame sequence in a GOP (a group of pictures). Therefore, it is possible to execute a recording pause at every frame or every two frames. In addition, the compressively encoding by the compression processing circuit 20 is prevented from significantly reducing picture qualities.

Regarding audio, the discontinuity detection/control circuit 15 starts to output a high-level control signal to the cross-fader 25 upon the detection of the timing t3 (see FIG. 2). The high-level control signal lasts for a predetermined time interval during which cross-fade is implemented. After the timing t3, the memory address signal fed to the memory 29 from the address generation circuit 28 is periodically updated or incremented from the frame-head-corresponding address in response to the audio sampling clock signal "fsa" since the disabling signal fed to the address generation circuit 28 is replaced by the enabling signal. During every audio sample period in the cross-fade time interval, the cross-fader 25 reads out a digital audio signal sample from a storage segment of the memory 29, the address of which is equal to the address represented by the memory address signal fed from the address generation circuit 28. The cross-fader 25 adds or mixes the digital audio signal sample from the memory 29 and a digital audio signal sample from the A/D converter 24 into an addition-result digital audio signal sample on a weighting basis. The cross-fader 25 applies the addition-resultant digital audio signal sample to the memory 29. The memory 29 stores the addition-resultant digital audio signal sample into its storage segment, the address of which is equal to the address represented by the memory address signal fed from the address generation circuit 28. Thus, in the present storage segment of the memory 29, the addition-resultant digital audio signal sample is written over the old digital audio signal sample. The weighting is designed so that during the cross-fade time interval, the percentage of the addition-result audio data occupied by the audio data from the A/D converter 24 will gradually increase while the percentage of the addition-result audio data occupied by the audio data from the memory 29 will gradually decrease. Thus, the audio data from the A/D converter 24 is faded in while the audio data from the memory 29 is faded out. As shown in FIG. 2, at a moment t4 between the timings t3 and t5, the discontinuity detection/control circuit 15 stops outputting the high-level control signal to the cross-fader 25. The moment t4 follows the timing t3 by a predetermined time interval equal to the cross-fade time interval. Therefore, at the moment t4, the cross-fader 25 is disabled, and the cross-fade is ended. After the moment t4, the cross-fader 25 passes every digital audio signal sample from the A/D converter 24 to the memory 29 as it is. As previously mentioned, after the timing t3, the memory address signal fed to the memory 29 from the address generation circuit 28 is periodically updated or incremented from the frame-head-corresponding address in response to the audio sampling clock signal "fsa". Accordingly, digital audio signal samples outputted from the cross-fader 25 are sequentially written into respective positionally-correct storage segments of the memory 29 while the memory address signal fed to the memory 29 is periodically updated or incremented. Thus, the writing of digital audio signal samples into the memory 29 from the cross-fader 25 restarts. Regarding the restart, a first digital audio signal sample written into the memory 29 corresponds to the head of the present frame (the head of the effective area in the present frame), and the storage segment into which the first digital audio signal sample is written corresponds to the head of the previous frame (the head of the effective area in the previous frame) being the defective frame or the frame immediately preceding the defective frame. As previously mentioned, upon the detection of the timing t5 after the restart, the discontinuity detection/control circuit 15 stops outputting the high-level halt signal to the compression processing circuits 20 and 30. When outputting the high-level halt signal is stopped, the compression processing circuit 30 restarts the readout of the audio data from the memory 29 and the compressively encoding of the audio data.

In the case where a discontinuity occurs in the input video signal at a mid point in a frame and this frame becomes a defective frame, a 1-frame-corresponding set of digital audio signal samples corresponding to the defective frame and an associated old frame are left in the memory 29. Also, digital audio signal samples corresponding to a given number of previous complete frames are left in the memory 29. After the discontinuity disappears and hence the input video signal returns to its normal state, the writing of digital audio signal samples into the memory 29 from the cross-fader 25 is restarted at a moment corresponding to a head of a first new frame (a head of the effective area in a first new frame). Firstly, digital audio signal samples composing a complete set for the first new frame are stored into positionally-correct storage segments of the memory 29 respectively. Subsequently, digital audio signal samples composing a complete set for a second first new frame are stored into positionally-correct storage segments of the memory 29 respectively. In the memory 29, the digital audio signal samples corresponding to the first new frame or the second new frame are written over the digital audio signal samples corresponding to the defective frame and the associated old frame. Accordingly, the digital audio signal samples corresponding to the defective frame are prevented from being read out and processed by the compression processing circuit 30. In this case, during a former stage corresponding to the cross-fade time interval, the cross-fader 25 is enabled. Thus, digital audio signal samples corresponding to a former portion of the first new frame are cross-fade-resultant samples generated by the cross-fader 25. After the discontinuity disappears and hence the input video signal returns to its normal state, a complete set of the digital audio signal samples for each new frame is transmitted from the memory 29 to the compression processing circuit 30, and is processed by the compression processing circuit 30. The cross-fade-resultant samples corresponding to the former portion of the first new frame suppress a click which might be caused by the discontinuity.

Figure 3:
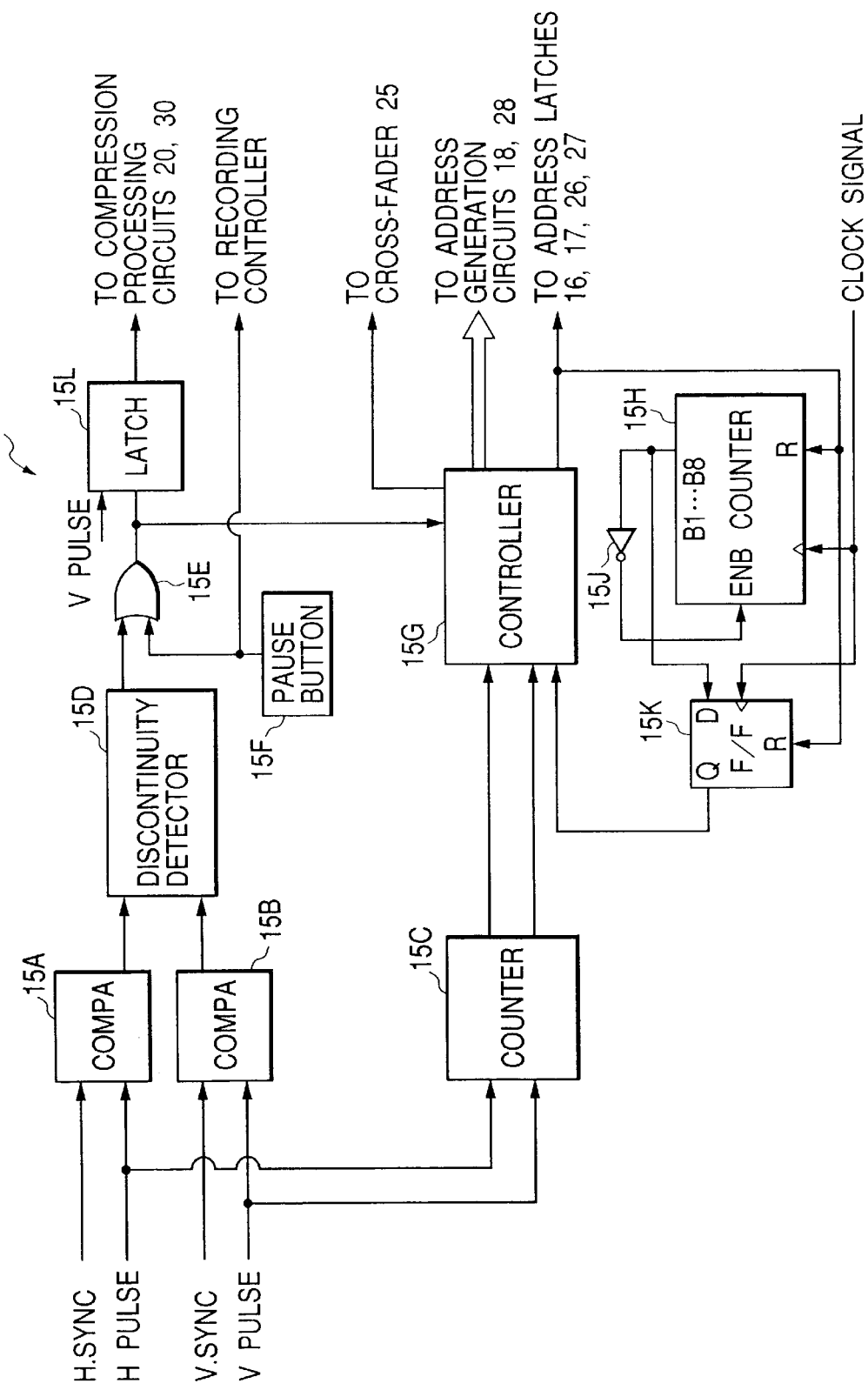
FIG. 3 is a block diagram of a discontinuity detection/control circuit in FIG. 1.

As shown in FIG. 3, the discontinuity detection/control circuit 15 includes comparators 15A and 15B, a counter 15C, a discontinuity detector 15D, an OR gate 15E, an encoding pause button 15F, a controller 15G, a counter 15H, an inverter 15J, a D flip-flop 15K, and a latch 15L.

In the discontinuity detection/control circuit 15, the device 15A compares the phases of the horizontal sync signal and the H pulse signal with each other to determine whether or not the phase lock between the horizontal sync signal and the H pulse signal is lost. When it is determined that the phase lock between the horizontal sync signal and the H pulse signal is lost, the comparator 15A outputs a "1" signal (a high-level signal) to the discontinuity detector 15D. Otherwise, the comparator 15A outputs a "0" signal (a low-level signal) to the discontinuity detector 15D.

The device 15B compares the phases of the vertical sync signal and the V pulse signal with each other to determine whether or not the phase lock between the vertical sync signal and the V pulse signal is lost. When it is determined that the phase lock between the vertical sync signal and the V pulse signal is lost, the comparator 15B outputs a "1" signal to the discontinuity detector 15D. Otherwise, the comparator 15B outputs a "0" signal to the discontinuity detector 15D.

The discontinuity detector 15D determines whether or not the input video signal becomes discontinuous in response to the output signals of the comparators 15A and 15B. When at least one of the output signals of the comparators 15A and 15B is "1", the discontinuity detector 15D outputs a "1" signal to a first input terminal of the OR gate 15E as an indication of the occurrence of a discontinuity in the input video signal. Otherwise, the discontinuity detector 15D outputs a "0" signal to the first input terminal of the OR gate 15E as an indication that the input video signal remains continuous. The discontinuity detector 15D includes, for example, an OR circuit. The output signal of the discontinuity detector 15D is a discontinuity detection signal.

The encoding pause button 15F outputs an encoding pause signal, which is a "1" signal, to a second input terminal of the OR gate 15E and a recording controller (not shown) when being changed to its ON position by a user. The encoding pause button 15F outputs an encoding pause cancel signal, which is a "0" signal, to the second input terminal of the OR gate 15E and the recording controller (not shown) when being returned to its OFF position by the user.

When at least one of the output signal of the discontinuity detector 15D and the output signal of the encoding pause button 15F is "1", the OR gate 15E outputs a "1" signal. Otherwise, the OR gate 15E outputs a "0" signal. The output signal of the OR gate 15E is fed to the controller 15G and also the latch 15L. The device 15L latches the output signal of the OR gate 15E in response to the V pulse signal. The device 15L outputs the latched signal to the compression processing circuits 20 and 30 (see FIG. 1). The output signal of the latch 15L which is "1" is used as a halt signal.

The counter 15C responds to every pulse in the H pulse signal and also every pulse in the V pulse signal, thereby detecting an effective area of pictures (frames or fields) represented by the input video signal and generating an effective-area signal representative thereof. The counter 15C outputs the effective-area signal to the controller 15G. The effective-area signal is "1" when the present moment (or the currently-processed time segment of the input video signal) corresponds to a position within the effective area of the current frame. The effective-area signal is "0" when the present moment (or the currently-processed time segment of the input video signal) corresponds to a position outside the effective area of the current frame.

The counter 15C detects a timing, which corresponds to the position of a head of every frame (a head of the effective area in every frame) represented by the input video signal, in response to the H pulse signal and the V pulse signal. The counter 15C generates a frame head pulse corresponding to the detected timing. The counter 15C outputs the frame head pulse to the controller 15G.

The controller 15G includes, for example, a programmable logic device which operates in accordance with a program stored in its internal ROM. The program is designed to implement processes mentioned later. Alternatively, the controller 15G may include a logic circuit.

In the case where the output signal of the OR gate 15E remains "0", the controller 15G generates either an enabling signal or a disabling signal in response to the effective-area signal. The controller 15G outputs either the enabling signal or the disabling signal to the address generation circuits 18 and 28 (see FIG. 1). When the effective-area signal is "1", that is, when the present moment (or the currently-processed time segment of the input video signal) corresponds to a position within the effective area of the current frame, the controller 15G outputs the enabling signal to the address generation circuits 18 and 28. When the effective-area signal is "0", that is, when the present moment (or the currently-processed time segment of the input video signal) corresponds to a position outside the effective area of the current frame, the controller 15G outputs the disabling signal to the address generation circuits 18 and 28.

In the case where the output signal of the OR gate 15E remains "0", the controller 15G generates a first load signal in response to every frame head pulse fed from the counter 15C. The controller 15G outputs the first load signal to the address latches 16, 17, 26, and 27 (see FIG. 1). At the same time, the controller 15G outputs the first load signal to the counter 15H and the D flip-flop 15K as a reset signal.

In the case where the output signal of the OR gate 15E is "1", the controller 15G continuously outputs the disabling signal to the address generation circuits 18 and 28 (see FIG. 1). In addition, the controller 15G is continuously inhibited from outputting the first load signal to the address latches 16, 17, 26, and 27 (see FIG. 1).

After the output signal of the OR gate 15E returns to "0", the controller 15G generates a second load signal in response to a first frame head pulse fed from the counter 15C. The controller 15G outputs the second load signal to the address generation circuits 18 and 28 (see FIG. 1).

When the discontinuity detector 15D determines that the input video signal becomes discontinuous, the discontinuity detector 15D outputs a "1" signal to the OR gate 15E. The "1" signal is transmitted via the OR gate 15E and the latch 15L to the compression processing circuits 20 and 30 (see FIG. 1) as a halt signal. When the encoding pause button 15F is changed to its ON position by the user, the encoding pause button 15F outputs a "1" signal to the OR gate 15E. The "1" signal is transmitted via the OR gate 15E and the latch 15L to the compression processing circuits 20 and 30 (see FIG. 1) as a halt signal. The "1" signal outputted from the encoding pause button 15F is used an indication that the input video signal becomes discontinuous.

The highest-bit output terminal among multiple-bit output terminals of the counter 15H is connected to the input terminal of the inverter 15J and the D input terminal of the D flip-flop 15K. The output terminal of the inverter 15J is connected to the enabling terminal of the counter 15H. The clock input terminals of the counter 15H and the D flip-flop 15K receive the audio sampling clock signal "fsa" from the PLL circuit 14 (see FIG. 1). It should be noted that the clock input terminals of the counter 15H and the D flip-flop 15K may receive the video sampling clock signal "fsv" from the PLL circuit 14. The Q output terminal of the D flip-flop 15K is connected to the controller 15G.

When the D flip-flop 15K receives a reset signal from the controller 15G, the output signal of the D flip-flop 15K returns to its low level state. When the counter 15H receives the reset signal from the controller 15G, the output signal of the counter 15H returns to its low level state and the counted pulse number represented thereby is cleared to "0". Then, the counted pulse number is incremented by every pulse of the audio sampling clock signal "fsa". When the counted pulse number reaches the predetermined number, the output signal of the counter 15H changes from its low level state to its high level state. The inverter 15J receives the high-level signal from the counter 15H, and thus applies a low-level signal to the enabling terminal of the counter 15H so that the counter 15H is suspended. At the same time, the D flip-flop 15K receives the high-level signal from the counter 15H, and latches the high-level signal in response to a pulse of the audio sampling clock signal "fsa". The D flip-flop 15K outputs the latched high-level signal to the controller 15G. The D flip-flop 15K continues to output the high-level signal to the controller 15G until being cleared by a next reset signal. The counter 15H is cleared by the next reset signal. The low-level output signal of the D flip-flop 15K indicates that cross-fade is impossible with respect to a defective frame. On the other hand, the high-level output signal of the D flip-flop 15K indicates that cross-fade is possible with respect to the defective frame.

At the moment of a change of the output signal from the OR gate 15E from "0" to "1", that is, at the moment (the moment t1 in FIG. 2) of the occurrence of a discontinuity in the input video signal, the controller 15G decides whether the output signal of the D flip-flop 15K is in its high level state or its low level state. When the output signal of the D flip-flop 15K is in its high level state, the controller 15G decides that cross-fade is possible with respect to the defective frame. When the output signal of the D flip-flop 15K is in its low level state, the controller 15G decides that cross-fade is impossible with respect to the defective frame. The controller 15G stores and holds information of the result of the decision regarding whether cross-fade is possible or impossible with respect to the defective frame. After the output signal of the OR gate 15E informs the controller 15G that the discontinuity disappears from the input video signal, the controller 15G uses the information of the cross-fade-related decision result as follows.

In the case where it has been decided that cross-fade is possible with respect to the defective frame, the controller 15G outputs a first selection signal to the address generation circuits 18 and 28. The first selection signal causes the address generation circuit 18 to be loaded with the memory address signal from the address latch 17 in response to the second load signal. Thus, the memory address signal fed to the memory 19 from the address generation circuit 18 is equalized to the memory address signal latched by the address latch 17 which represents an address corresponding to the head of the defective frame (the frame subjected to the discontinuity in the input video signal). At the same time, the first selection signal causes the address generation circuit 28 to be loaded with the memory address signal from the address latch 27 in response to the second load signal. Thus, the memory address signal fed to the memory 29 from the address generation circuit 28 is equalized to the memory address signal latched by the address latch 27 which represents an address corresponding to the head of the defective frame (the frame subjected to the discontinuity in the input video signal). In addition, the controller 15G outputs a high-level control signal to the cross-fader 25 for the pre-determined time interval. Accordingly, cross fade is implemented.

In the case where it has been decided that cross-fade is impossible with respect to the defective frame, the controller 15G outputs a second selection signal to the address generation circuits 18 and 28. The second selection signal causes the address generation circuit 18 to be loaded with the memory address signal from the address latch 16 in response to the second load signal. Thus, the memory address signal fed to the memory 19 from the address generation circuit 18 is equalized to the memory address signal latched by the address latch 16 which represents an address corresponding to the head of the frame immediately preceding the defective frame (the frame subjected to the discontinuity in the input video signal). At the same time, the second selection signal causes the address generation circuit 28 to be loaded with the memory address signal from the address latch 26 in response to the second load signal. Thus, the memory address signal fed to the memory 29 from the address generation circuit 28 is equalized to the memory address signal latched by the address latch 26 which represents an address corresponding to the head of the frame immediately preceding the defective frame (the frame subjected to the discontinuity in the input video signal). In addition, the controller 15G outputs a high-level control signal to the cross-fader for the predetermined time interval. Accordingly, cross fade is implemented.

Figure 4:
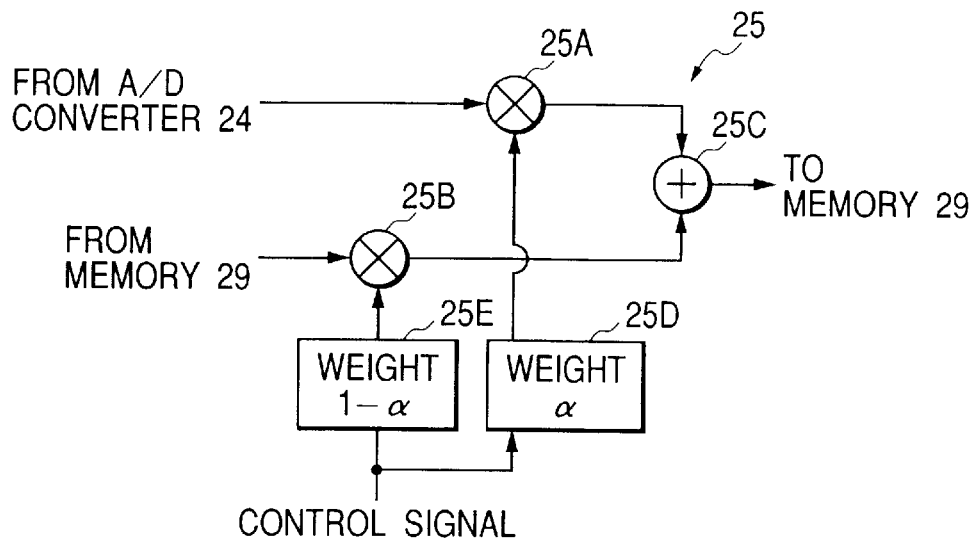
FIG. 4 is a block diagram of a cross-fader in FIG. 1.

As shown in FIG. 4, the cross-fader 25 includes multipliers 25A and 25B, an adder 25C, and signal generators 25D and 25E. A first input terminal of the multiplier 25A is connected to the output terminal of the A/D converter 24 (see FIG. 1). A second input in terminal of the multiplier 25A is connected to the output terminal of the signal generator 25D. The output terminal of the multiplier 25A is connected to a first input terminal of the adder 25C. A first input terminal of the multiplier 25B is connected to the output terminal of the memory 29 (see FIG. 1). A second input terminal of the multiplier 25B is connected to the output terminal of the signal generator 25E. The output terminal of the multiplier 25B is connected to a second input terminal of the adder 25C. The output terminal of the adder 25C is connected to the input terminal of the memory 29 (see FIG. 1). The signal generators 25D and 25E have terminals subjected to the control signal fed from the discontinuity detection/control circuit 15 (see FIG. 1).

The signal generator 25D produces a signal representative of the weighting coefficient "$\alpha$" in response to the control signal fed from the discontinuity detection/control circuit 15. The signal generator 25D outputs the produced weighting-coefficient signal to the multiplier 25A. The signal generator 25E produces a signal representative of the weighting coefficient "$1-\alpha$" in response to the control signal fed from the discontinuity detection/control circuit 15. The signal generator 25E outputs the produced weighting-coefficient signal to the multiplier 25B. The multiplier 25A receives the audio data from the A/D converter 24 (see FIG. 1). The device 25A multiplies the audio data from the A/D converter 24 by the weighting coefficient "$\alpha$". The multiplier 25A outputs the multiplication-resultant data to the adder 25C. The multiplier 25B receives the audio data from the memory 29 (see FIG. 1). The device 25B multiplies the audio data from the memory 29 by the weighting coefficient "$1-\alpha$". The multiplier 25B outputs the multiplication-resultant data to the adder 25C. The adder 25C combines the output data from the multiplier 25A and the output data from the multiplier 25B into addition-result audio data. The adder 25C outputs the addition-result audio data to the memory 29.

In the case where the control signal fed from the discontinuity detection/control circuit 15 remains in its low level state, the weighting coefficient "$\alpha$" continues to be "1" while the weighting coefficient "$1-\alpha$" continues to be "0". In this case, the cross-fader 25 remains disabled. While the cross-fader 25 remains disabled, the audio data from the A/D converter 24 pass through the multiplier 25A and the adder 25C and then reach the memory 29 as they are. On the other hand, in the case where the control signal fed from the discontinuity detection/control circuit 15 remains in its high level state, the weighting coefficient "$\alpha$" gradually increases from "0" to "1" while the weighting coefficient "$1-\alpha$" gradually decreases from "1" to "0". In this case, the cross-fader 25 remains enabled. While the cross-fader 25 is enabled, the device 25 mixes the audio data from the A/D converter 24 and the audio data from the memory 29 at a mixing rate which gradually varies. The cross-fader 25 outputs the mixing-result audio data to the memory 29.

The signal generators 25D and 25E include, for example, counters responsive to the audio sampling clock signal "fsa" fed from the PLL circuit 14 (see FIG. 1).

It should be noted that the previously-mentioned frame-by-frame signal processing may be replaced by field-by-field signal processing.

Second Embodiment

A second embodiment of this invention is similar to the first embodiment thereof except that a cross-fader 125 replaces the cross-fader 25 (see FIG. 4).

Figure 5:
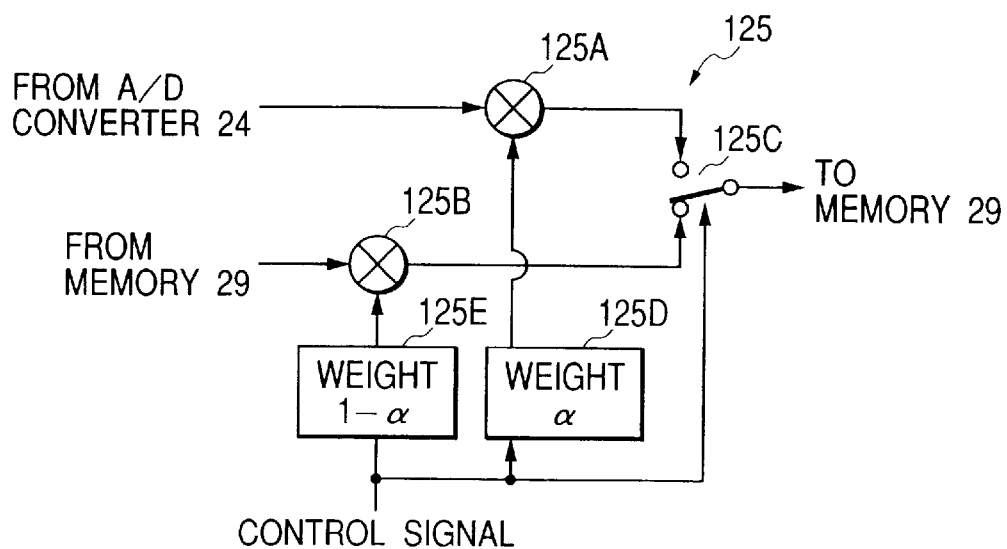
FIG. 5 is a block diagram of a cross-fader in a second embodiment of this invention.

As shown in FIG. 5, the cross-fader 125 includes multipliers 125A and 125B, a switch 125C, and signal generators 125D and 125E. A first input terminal of the multiplier 125A is connected to the output terminal of the A/D converter 24 (see FIG. 1). A second input terminal of the multiplier 125A is connected to the output terminal of the signal generator 125D. The output terminal of the multiplier 125A is connected to a first input side of the switch 125C. A first input terminal of the multiplier 125B is connected to the output terminal of the memory 29 (see FIG. 1). A second input terminal of the multiplier 125B is connected to the output terminal of the signal generator 125E. The output terminal of the multiplier 125B is connected to a second input side of the switch 125C. The output side of the switch 125C is connected to the input terminal of the memory 29 (see FIG. 1). The signal generators 125D and 125E have terminals subjected to the control signal fed from the discontinuity detection/control circuit 15 (see FIG. 1).

The signal generator 125D produces a signal representative of the weighting coefficient "$\alpha$" in response to the control signal fed from the discontinuity detection/control circuit 15. The signal generator 125D outputs the produced weighting-coefficient signal to the multiplier 125A. The signal generator 125E produces a signal representative of the weighting coefficient "$1-\alpha$" in response to the control signal fed from the discontinuity detection/control circuit 15. The signal generator 125E outputs the produced weighting-coefficient signal to the multiplier 125B. The multiplier 125A receives the audio data from the A/D converter 24 (see FIG. 1). The device 125A multiplies the audio data from the A/D converter 24 by the weighting coefficient "$\alpha$". The multiplier 125A outputs the multiplication-resultant data to the switch 125C. The multiplier 125B receives the audio data from the memory 29 (see FIG. 1). The device 125B multiplies the audio data from the memory 29 by the weighting coefficient "$1-\alpha$". The multiplier 125B outputs the multiplication-resultant data to the switch 125C. The switch 125C selects one of the output data from the multiplier 125A and the output data from the multiplier 125B in response to the control signal fed from the discontinuity detection/control circuit 15. The switch 125C outputs the selected data to the memory 29.

In the case where the control signal fed from the discontinuity detection/control circuit 15 remains in its low level state, the weighting coefficient "$\alpha$" continues to be "1" and the switch 125C selects the output data from the multiplier 125A. In this case, the cross-fader 125 remains disabled. While the cross-fader 125 remains disabled, the audio data from the A/D converter 24 pass through the multiplier 125A and the switch 125C and then reach the memory 29 as they are.

When the control signal fed from the discontinuity detection/control circuit 15 changes from its low level state to its high level state, the weighting coefficient "$1-\alpha$" is set to "1" and the switch 125C selects the output data from the multiplier 125B. In the case where the control signal fed from the discontinuity detection/control circuit 15 remains in its high level state thereafter, the weighting coefficient "$1-\alpha$" gradually decreases from "1" to "0" and the switch 125C continues to select the output data from the multiplier 125B. In this case, the cross-fader 125 is enabled.

When the control signal fed from the discontinuity detection/control circuit 15 returns from its high level state to its low level state, the weighting coefficient "$\alpha$" is set to "0" and the switch 125C selects the output data from the multiplier 125A. In the case where the control signal fed from the discontinuity detection/control circuit 15 remains in its low level state thereafter, the weighting coefficient "$\alpha$" gradually increases from "0" to "1" and then remains "1" while the switch 125C continues to select the output data from the multiplier 125A. In this case, the cross-fader 125 is enabled.

What is claimed is:

1. An information compressing apparatus comprising:
a first address generation circuit for generating a first address signal;
a second address generation circuit for generating a second address signal;
a first memory for storing a video signal in response to the first address signal generated by the first address generation circuit;
a second memory for storing an audio signal in response to the second address signal generated by the second address generation circuit;
first means for periodically updating the first address signal generated by the first address generation circuit;
second means for periodically updating the second address signal generated by the second address generation circuit;
a first compression processing circuit for reading out the video signal from the first memory, and subjecting the read-out video signal to a first compressively encoding process;
a second compression processing circuit for reading out the audio signal from the second memory, and subjecting the read-out audio signal to a second compressively encoding process;
third means for detecting a head of every frame represented by the video signal;
fourth means for storing a first state of the first address signal generated by the first address generation circuit which corresponds to a latest frame head detected by the third means;
fifth means for storing a second state of the first address signal generated by the first address generation circuit which corresponds to a second frame head detected by the third means, the second frame head immediately preceding the latest frame head;
sixth means for storing a first state of the second address signal generated by the second address generation circuit which corresponds to the latest frame head detected by the third means;
seventh means for storing a second state of the second address signal generated by the second address generation circuit which corresponds to the second frame head detected by the third means;
eighth means for detecting whether or not the video signal becomes discontinuous;
ninth means for suspending operation of the first means and also operation of the first compression processing circuit when the eighth means detects that the video signal becomes discontinuous;
tenth means for suspending operation of the second means and also operation of the second compression processing circuit when the eighth means detects that the video signal becomes discontinuous;
eleventh means for detecting whether or not the video signal returns to a normally continuous state after the video signal becomes discontinuous;
twelfth means for starting the updating of the first address signal by the first means from one of the first state stored by the fourth means and the second state stored by the fifth means when the eleventh means detects that the video signal returns to its normally continuous state after the video signal becomes discontinuous;
thirteenth means for starting the updating of the second address signal by the second means from one of the first state stored by the sixth means and the second state stored by the seventh means when the eleventh means detects that the video signal returns to its normally continuous state after the video signal becomes discontinuous; and fourteenth means for, in cases where the eleventh means detects that the video signal returns to its normally continuous state after the video signal becomes discontinuous, reading out the audio signal from the second memory and mixing the read-out audio signal and a new audio signal into a mixing-resultant audio signal, and writing the mixing-resultant audio signal into the second memory until the second address signal reaches a prescribed address value.

2. An information compressing apparatus as recited in claim 1, further comprising:

fifteenth means for deciding whether or not an address value represented by the second address signal, which occurs when the eighth means detects that the video signal becomes discontinuous, is smaller than the prescribed address value;

sixteenth means for, in cases where the fifteenth means decides that the address value represented by the second address signal is smaller than the prescribed address value, to cause the twelfth means to start the updating of the first address signal from the second state stored by the fifth means;

seventeenth means for, in cases where the fifteenth means decides that the address value represented by the second address signal is smaller than the prescribed address value, to cause the thirteenth means to start the updating of the second address signal from the second state stored by the seventh means;

a eighteenth means for, in cases where the fifteenth means decides that the address value represented by the second address signal is not smaller than the prescribed address value, to cause the twelfth means to start the updating of the first address signal from the first state stored by the fourth means; and nineteenth means for, in cases where the fifteenth means decides that the address value represented by the second address signal is not smaller than the prescribed address value, to cause the thirteenth means to start the updating of the second address signal from the first state stored by the sixth means.

3. An information compressing apparatus as recited in claim 1, wherein the fourteenth means comprises means for fading in the new audio signal and fading out the read-out audio signal while mixing the read-out audio signal and the new audio signal.

4. An information compressing apparatus as recited in claim 1, wherein the eighth means comprises:

an encoding pause button; and means for detecting whether or not the video signal becomes discontinuous in response to a position of the encoding pause button.

5. An information compressing apparatus as recited in claim 1, wherein the eleventh means comprises:

an encoding pause button; and means for detecting whether or not the video signal returns to a normally continuous state after the video signal becomes discontinuous in response to a position of the encoding pause button.

6. An apparatus comprising:

first means for detecting whether or not a first video signal becomes discontinuous and hence a defective frame picture occurs in a stream of frame pictures represented by the first video signal;

second means for removing the defective frame picture from the stream of frame pictures to change the first video signal into a second video signal representing the stream of frame pictures except the defective frame picture;

third means for dividing a first audio signal into a second audio signal and a third audio signal, the second audio signal occurring until the first video signal becomes discontinuous, the third audio signal occurring after the first video signal becomes discontinuous;

fourth means for storing the second audio signal; and fifth means for mixing the second audio signal stored by the fourth means and the third audio signal into a fourth audio signal to fade in the third audio signal and to fade out the second audio signal in the fourth audio signal.

* * * * *